US011881574B2

(12) United States Patent
McGlen et al.

(10) Patent No.: US 11,881,574 B2
(45) Date of Patent: Jan. 23, 2024

(54) THERMAL MANAGEMENT SYSTEM

(71) Applicant: Thermal Corp., Wilmington, DE (US)

(72) Inventors: Ryan J. McGlen, Ashington (GB);
Kevin V. Lynn, Morpeth (GB)

(73) Assignee: Aavid Thermal Corp., Wilmington, DE (US)

( * ) Notice: Subject to any disclaimer, the term of this patent is extended or adjusted under 35 U.S.C. 154(b) by 725 days.

(21) Appl. No.: 16/768,792

(22) PCT Filed: Nov. 30, 2018

(86) PCT No.: PCT/US2018/063340
§ 371 (c)(1),
(2) Date: Jun. 1, 2020

(87) PCT Pub. No.: WO2019/108950
PCT Pub. Date: Jun. 6, 2019

(65) Prior Publication Data
US 2021/0175563 A1 Jun. 10, 2021

Related U.S. Application Data

(60) Provisional application No. 62/593,706, filed on Dec. 1, 2017.

(51) Int. Cl.
*H01M 10/65* (2014.01)
*H01M 10/6557* (2014.01)
(Continued)

(52) U.S. Cl.
CPC ............ *H01M 10/6557* (2015.04); *F28F 3/12* (2013.01); *F28F 9/02* (2013.01); *F28F 9/16* (2013.01);
(Continued)

(58) Field of Classification Search
CPC ........... H01M 10/6557; H01M 10/613; H01M 10/615; H01M 10/647; H01M 2220/20;
(Continued)

(56) References Cited

U.S. PATENT DOCUMENTS 5,230,966 A   7/1993  Voss et al.
6,051,331 A   4/2000  Spear, Jr. et al.
(Continued)

FOREIGN PATENT DOCUMENTS

| CN | 105895991 A | 8/2016 |
| DE | 102013209980 A1 | 4/2014 |
| WO | 2011/088997 A1 | 7/2011 |

OTHER PUBLICATIONS

European Patent Office Extended Search Report for Application No. 18882547.5 dated Jul. 21, 2021 (8 pages).
(Continued)

*Primary Examiner* — Tho V Duong
(74) *Attorney, Agent, or Firm* — Michael Best & Friedrich LLP

(57) ABSTRACT

A device for removal of heat from a plurality of heat sources includes a first manifold to receive a working fluid, and a plurality of elongated intermediate frame members each in thermal communication with at least one of the plurality of heat sources. Each intermediate frame member includes a microchannel in fluid communication with the first manifold to receive the working fluid from the first manifold. Each elongated intermediate frame member includes a slot extending along a longitudinal axis of the heat transfer device. The device further includes a second manifold spaced from the first manifold and in fluid communication with the plurality of intermediate frame members to receive the working fluid from each microchannel in the plurality of intermediate frame members. The second manifold is con-
(Continued)

figured to transfer the working fluid away from the plurality of heat sources.

31 Claims, 14 Drawing Sheets

(51) Int. Cl.
    *H01M 10/613*     (2014.01)
    *H01M 10/615*     (2014.01)
    *H01M 10/647*     (2014.01)
    *F28F 3/12*     (2006.01)
    *F28F 9/16*     (2006.01)
    *F28F 9/02*     (2006.01)

(52) U.S. Cl.
    CPC ....... *H01M 10/613* (2015.04); *H01M 10/615* (2015.04); *H01M 10/647* (2015.04); *F28F 2260/02* (2013.01); *F28F 2275/06* (2013.01); *F28F 2275/14* (2013.01); *H01M 2220/20* (2013.01)

(58) Field of Classification Search
    CPC ........ F28F 3/12; F28F 9/02; F28F 9/16; F28F 2260/02; F28F 2275/06; F28F 2275/14
    See application file for complete search history.

(56) References Cited

U.S. PATENT DOCUMENTS

| | | | |
|---|---|---|---|
| 6,274,262 B1 | 8/2001 | Canfield | |
| 6,790,554 B2 | 9/2004 | May et al. | |
| 6,817,097 B2 | 11/2004 | Sarraf et al. | |
| 6,903,929 B2 * | 6/2005 | Prasher | H01L 23/4006 361/689 |
| 7,318,974 B2 | 1/2008 | Ohara et al. | |
| 8,027,162 B2 * | 9/2011 | Campbell | H05K 7/2079 361/716 |
| 8,081,473 B2 * | 12/2011 | Cipolla | H01L 23/473 361/679.52 |
| 8,343,650 B2 | 1/2013 | Raiser | |
| 8,383,280 B2 | 2/2013 | Niroumand | |
| 8,587,943 B2 * | 11/2013 | Barina | H01L 23/427 361/720 |
| 8,599,557 B2 * | 12/2013 | Peterson | G06F 1/20 361/698 |
| 8,835,038 B2 | 9/2014 | Abels et al. | |
| 9,370,122 B2 * | 6/2016 | Chainer | G06F 3/044 |
| 9,496,588 B2 | 11/2016 | Nguyen et al. | |
| 2003/0090873 A1 * | 5/2003 | Ohkouchi | H01L 24/40 257/E23.098 |
| 2005/0121173 A1 * | 6/2005 | Inagaki | F28F 9/0236 257/E23.098 |
| 2007/0116996 A1 | 5/2007 | Pavlik et al. | |
| 2008/0076005 A1 | 3/2008 | Levesque et al. | |
| 2009/0325059 A1 | 12/2009 | Niedzwiecki et al. | |
| 2011/0027640 A1 | 2/2011 | Gadawski et al. | |
| 2011/0136030 A1 | 6/2011 | Valencia et al. | |
| 2012/0107664 A1 | 5/2012 | Lee et al. | |
| 2013/0115506 A1 | 5/2013 | Wayne et al. | |
| 2013/0164593 A1 | 6/2013 | Burrows et al. | |
| 2013/0216887 A1 | 8/2013 | Wayne et al. | |
| 2013/0309543 A1 | 11/2013 | Kim et al. | |
| 2013/0342987 A1 * | 12/2013 | Yang | H01L 23/473 361/679.32 |
| 2014/0242437 A1 | 8/2014 | Heise | |
| 2014/0374055 A1 | 12/2014 | Payne | |
| 2016/0049704 A1 | 2/2016 | Beyerle, II et al. | |
| 2016/0308223 A1 | 10/2016 | Jones et al. | |

OTHER PUBLICATIONS

International Search Report with Written Opinion for related Application No. PCT/US2018/063340 dated Feb. 19, 2019 (11 Pages).
Ashley Fly, "Thermal and Water Management of Evaporatively Cooled Fuel Cell Vehicles" A Doctoral Thesis, Loughborough University, Nov. 2015 (196 Pages).
Chinese Patent Office Action for application 201880088327.5, dated Mar. 31, 2023 (28 pages with translation).
European Patent Office Extended Search Report for Application No. 18882547.5 dated Mar. 14, 2023 (5 pages).

\* cited by examiner

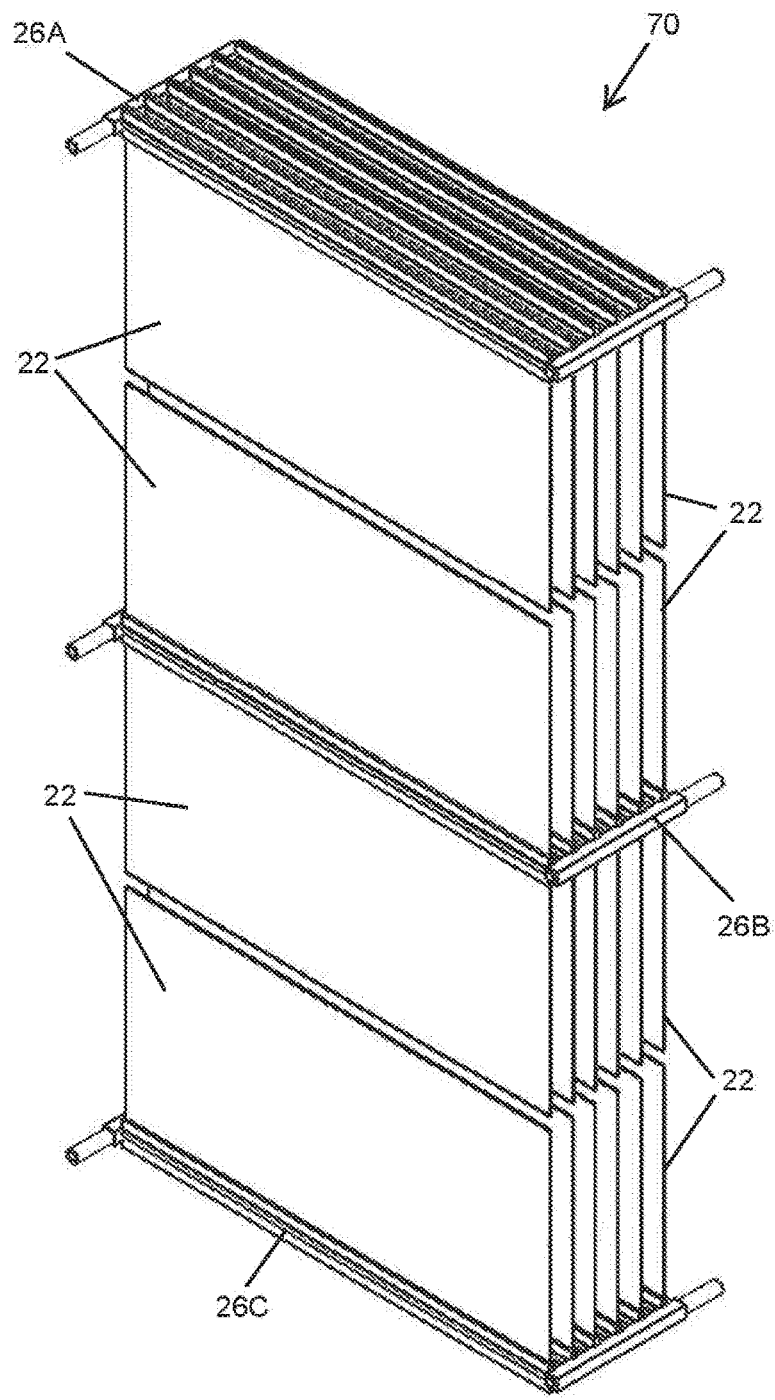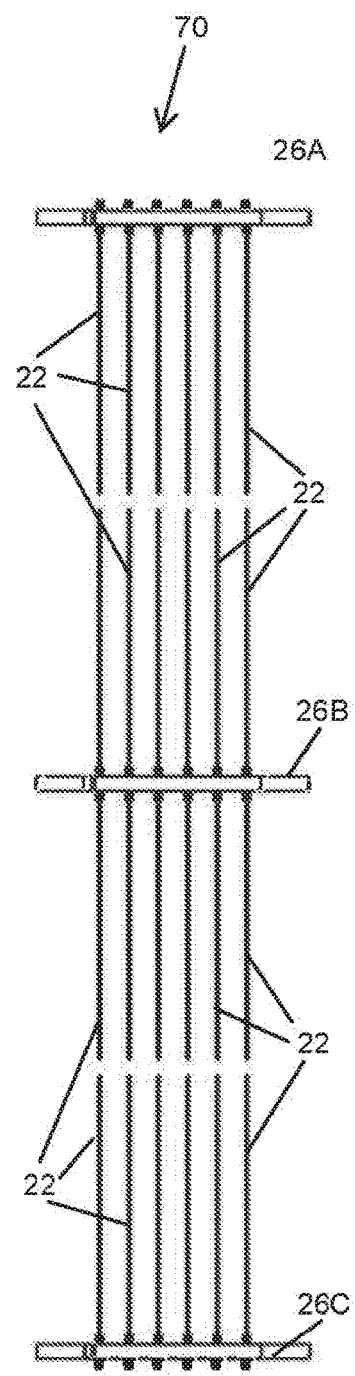
FIG. 12A
FIG. 12B

THERMAL MANAGEMENT SYSTEM

CROSS-REFERENCE TO RELATED APPLICATIONS

This patent application is the U.S. national stage entry, under 35 U.S.C. § 371, of International Application Number PCT/US2018/063340, filed Nov. 30, 2018, which claims priority to U.S. Provisional Patent Application No. 62/593,706, filed Dec. 1, 2017, the entire contents of each of which are incorporated by reference herein.

FIELD OF THE INVENTION

The present application relates to thermal management systems, and in particular to thermal management systems for battery packs (e.g., formula-E battery packs).

BACKGROUND OF THE INVENTION

Battery packs used within high end clusters, such as electric vehicle battery packs, require advanced thermal management to combat challenges associated with non-uniform temperature profiles or operating temperatures that are too high or too low. Such problems can cause issues such as reduced lifetime of the battery pack, battery fade, and reduced discharge current/operational time. These challenges are amplified within high-discharge rate and varying transient discharge applications, such as motorsport electric vehicle applications. Ambient temperatures also affect the performance of the battery pack. To maximize the electrical performance and lifetime of a battery pack, it is sometimes required to maintain an isothermal temperature across the surface of each cell, across all cells within the pack, or to cool or heat the entire pack to maintain the isothermal temperature within a specific temperature range.

Current formula-E battery packs use individually formed microchannel cold flow plates that are connected to a relatively bulky polymer chassis. The polymer component incorporates through-holes and o-rings that when stacked next to one another are compressed to form a seal between adjacent cold plates and the polymer frames. By stacking multiple frames/pouch cells, inlet and outlet plenums are formed enabling a single liquid inlet and outlet port to be deployed. A major issue with these current systems, however, is that there are hundreds of seals in the battery pack (2 per pouch cell) that are prone to leaking. Additionally, these types of devices have a relatively large mass due to the bulky polymer chassis.

SUMMARY OF THE INVENTION

In one embodiment, the invention provides a device for removal of heat from a plurality of heat sources. The device includes a first manifold to receive a working fluid, and a plurality of elongated intermediate frame members each in thermal communication with at least one of the plurality of heat sources. Each intermediate frame member includes a microchannel in fluid communication with the first manifold to receive the working fluid from the first manifold. Each elongated intermediate frame member includes a slot extending along a longitudinal axis of the heat transfer device. The device further includes a second manifold spaced from the first manifold and in fluid communication with the plurality of intermediate frame members to receive the working fluid from each microchannel in the plurality of intermediate frame members. The second manifold is configured to transfer the working fluid away from the plurality of heat sources.

In another embodiment, the invention provides a heat transfer system that includes a plurality of battery pouches, and a framework disposed adjacent the battery pouches along one side of the plurality of battery pouches, the framework having an inlet and an outlet for working fluid to enter and exit the framework, respectively. The heat transfer system further includes a plurality of thermal conducting devices coupled to the framework and extending parallel to one another and away from the framework. Each of the thermal conducting devices is a plate of encapsulated graphite having a first end coupled to the framework, and a second, opposite free end that is disposed between two of the battery pouches. The plates extend away from the framework along a direction that is perpendicular to a direction of movement of working fluid within the framework.

In another embodiment, the invention provides a device for removal of heat from a plurality of heat sources. The device includes a first frame member having a first channel configured to direct the flow of working fluid to a plurality of intermediate frame members, each intermediate frame member comprising a channel in fluid communication with the first channel. The device further includes a second frame member spaced from the first frame member, the second frame member having a second channel in fluid communication with the plurality of intermediate frame members to receive the working fluid from the plurality of intermediate frame members, the second channel configured to transfer the working fluid away from the plurality of heat sources. The device further includes a plurality of heat conducting devices each in thermal communication with one of the plurality of intermediate frame members. Each heat conducting device is positioned to receive heat from one of the plurality of heat sources.

Other aspects of the invention will become apparent by consideration of the detailed description and accompanying drawings.

BRIEF DESCRIPTION OF THE DRAWINGS

FIG. 12A is a perspective view of the stacked thermal management systems of FIG. 11, without the plurality of pouch cells.

FIG. 12B is a side view of the stacked thermal management systems of FIG. 12A.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limited.

DETAILED DESCRIPTION

The term "thermal management system" used herein refers to any system that is arranged to remove heat from one or more heat sources and to move the heat to a separate location. The term "spreader" used herein refers for example to a plate, sheet, disk, enclosure, chamber, or other structure that receives heat and spreads or otherwise moves the heat from one location to another (e.g., linearly or generally within a plane defined by the spreader). The term "k-Core" used herein refers to Thermacore's k-Core technology (k-Core® material, available from Thermacore, Inc. of Lancaster, PA 17601), which uses encapsulated graphite to move heat (e.g., in avionic applications). One example of k-Core technology material is encapsulated annealed pyrolytic graphite (APG) which creates high-conductivity thermal spreading (e.g., up to three times the conductivity of solid copper with lower mass than aluminum). The term "encapsulated" or "encapsulating material" or "encapsulant" used herein refers, for example, to material (e.g., an aluminum foil, copper alloy, ceramic, composite, or other material) that forms an enclosure or covering or in some instances a chamber and that encapsulates or otherwise encloses and contains material therein, such as k-Core material.

Figure 1:
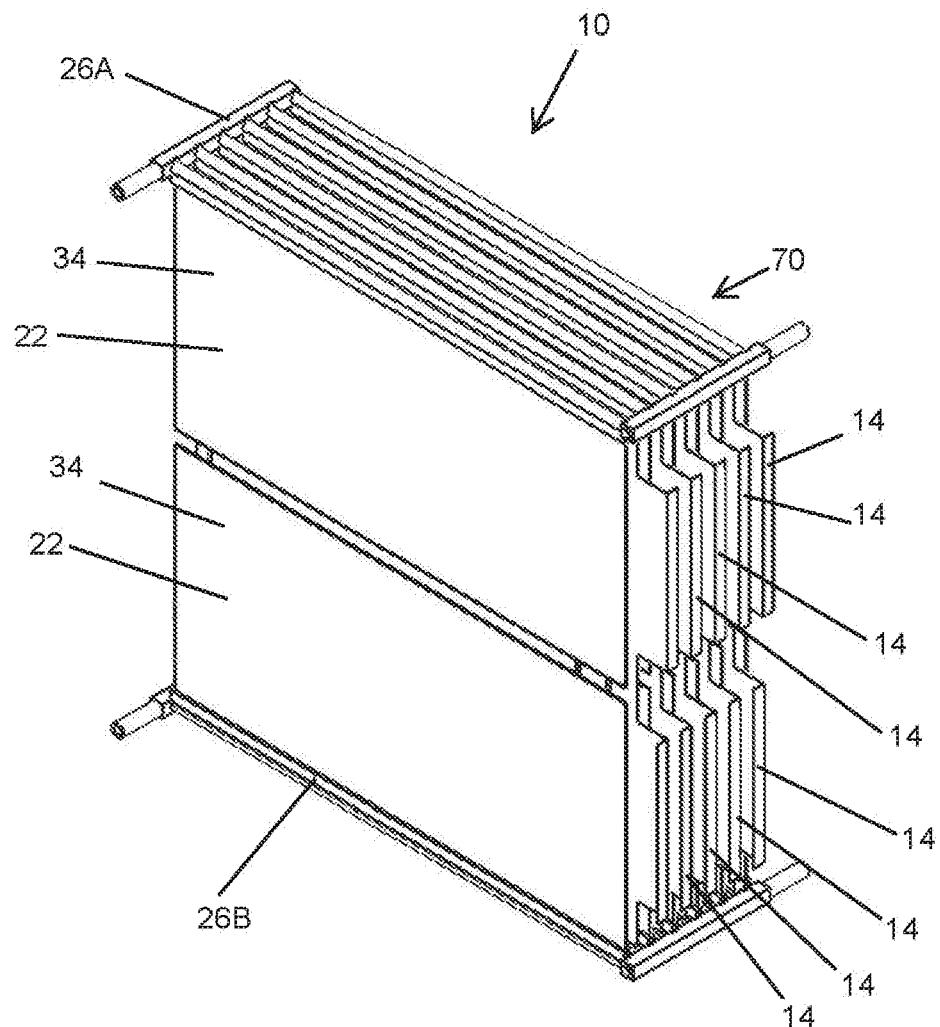
FIG. 1 is a perspective view of a thermal management system according to one embodiment.
Figure 3A:
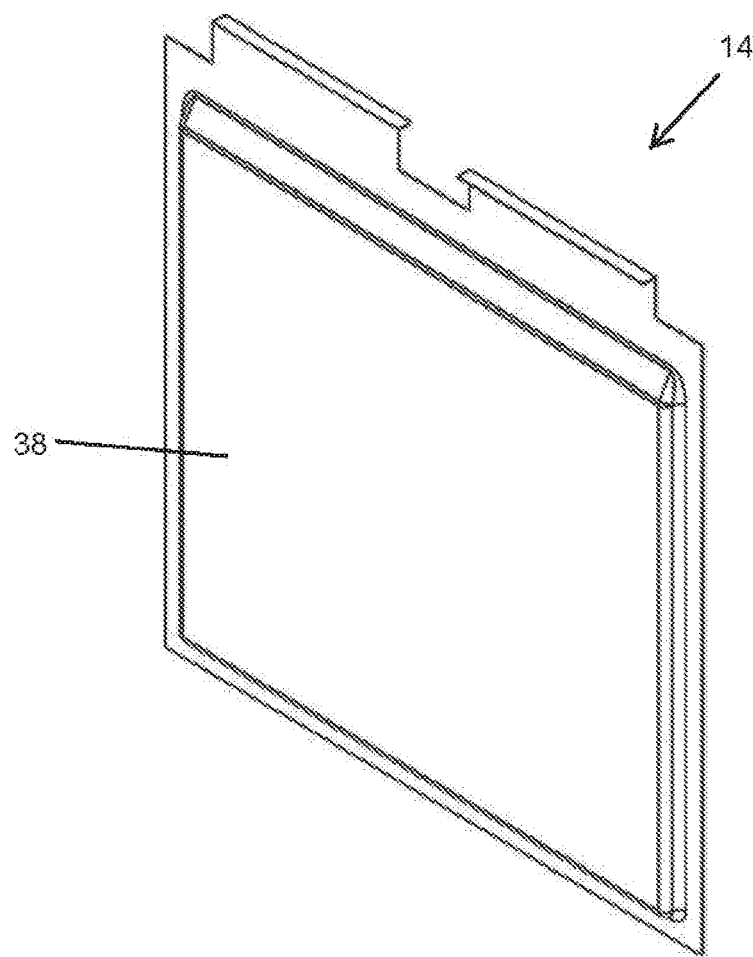
FIG. 3A is a perspective view of a pouch cell of the thermal management system of FIG. 1.
Figure 3B:
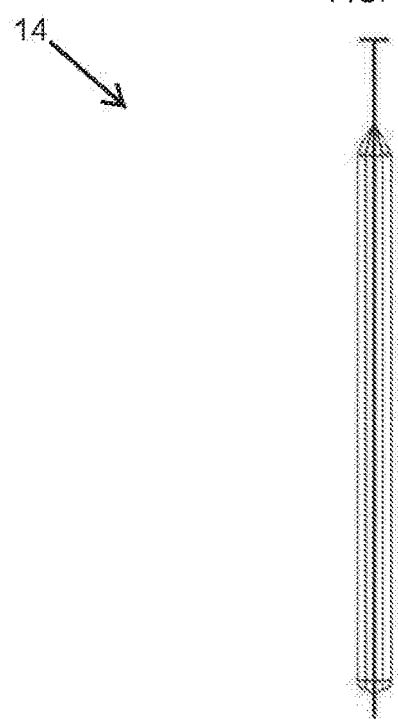
FIG. 3B is a side view of the pouch cell of FIG. 3A.

In one exemplary embodiment, as shown in FIG. 1, a thermal management system 10 may be used in any application where multiple heat dissipating devices, such as battery packs or other electrical components, including a closely-packed or stacked heat source, require temperature control within a specific temperature range or an isothermal temperature profile throughout the device. The present embodiment can be applied in thermal management of electric vehicle battery packs using flat or generally flat pouch cells 14 stacked in multiple banks of cells that are installed into an overall battery pack chassis. Each bank of pouch cells 14 is directly coupled to or otherwise is in communication with one or more of the thermal management systems 10 described herein. The term "pouch cell" used herein refers to a heat source, and in the illustrated embodiment, to a heat source having a structure that acts as a fuel cell or battery cell of a battery pack. The pouch cell 14 defines an enclosure or chamber therein for generation of energy. FIGS. 3A and 3B illustrate a single pouch cell 14.

Other cell formats, including, but not limited to cylindrical cells, are also envisioned. Cylindrical cells represent a common type of battery format (e.g., for an AA battery) typically for consumer use. The interior of a typical cylindrical battery includes three concentric layers of film/foil (copper, polymer isolation layer and aluminum foil) that are rolled up inside the battery cylinder and that define the current and voltage. One foil (e.g., aluminum) has a carbon coating that stores the charge. An electrolyte fills the voids between the layers. In some embodiments, rather than rolling up the adjacent foil and polymer layers into a cylinder, multiple separate sheets of foil and polymer are stacked on top of one-another. The foil layers may be vacuum sealed within a polymer film container (typically used in the food industry) that forms a flat rectangular pack. The laminated layers forming the positive and negative terminals are exposed. The rectangular shape increases packing density into the pack chassis.

In some embodiments, the thermal management system 10 described herein includes three main components (see FIGS. 1, 2A-2C, and 7):

1. a thermal conduction device 22;
2. a thermal regulation system 26A, 26B; and
3. a thermal extraction interface 30.

Figure 2A:
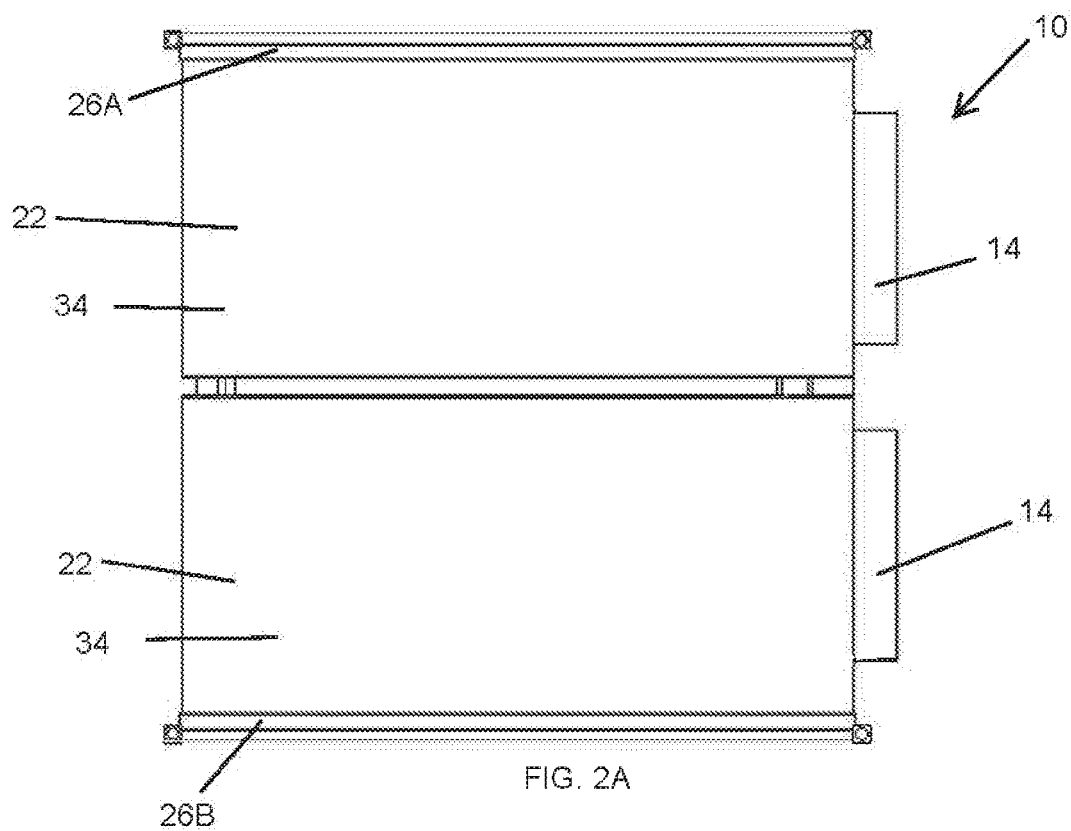
FIG. 2A is a front view of the thermal management system of FIG. 1.
Figure 2B:
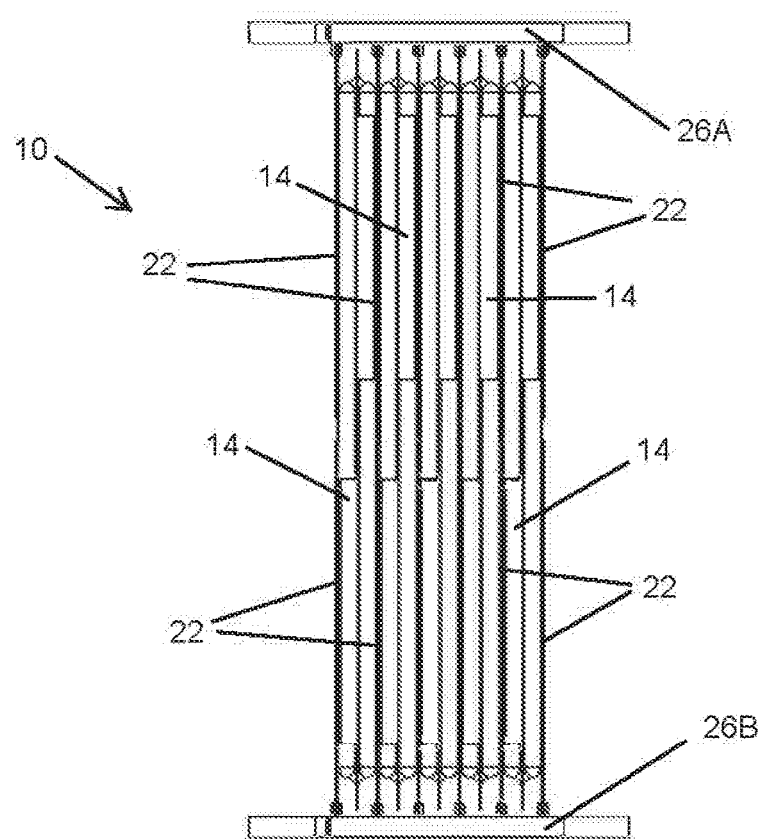
FIG. 2B is a side view of the thermal management system of FIG. 1.
Figure 2C:
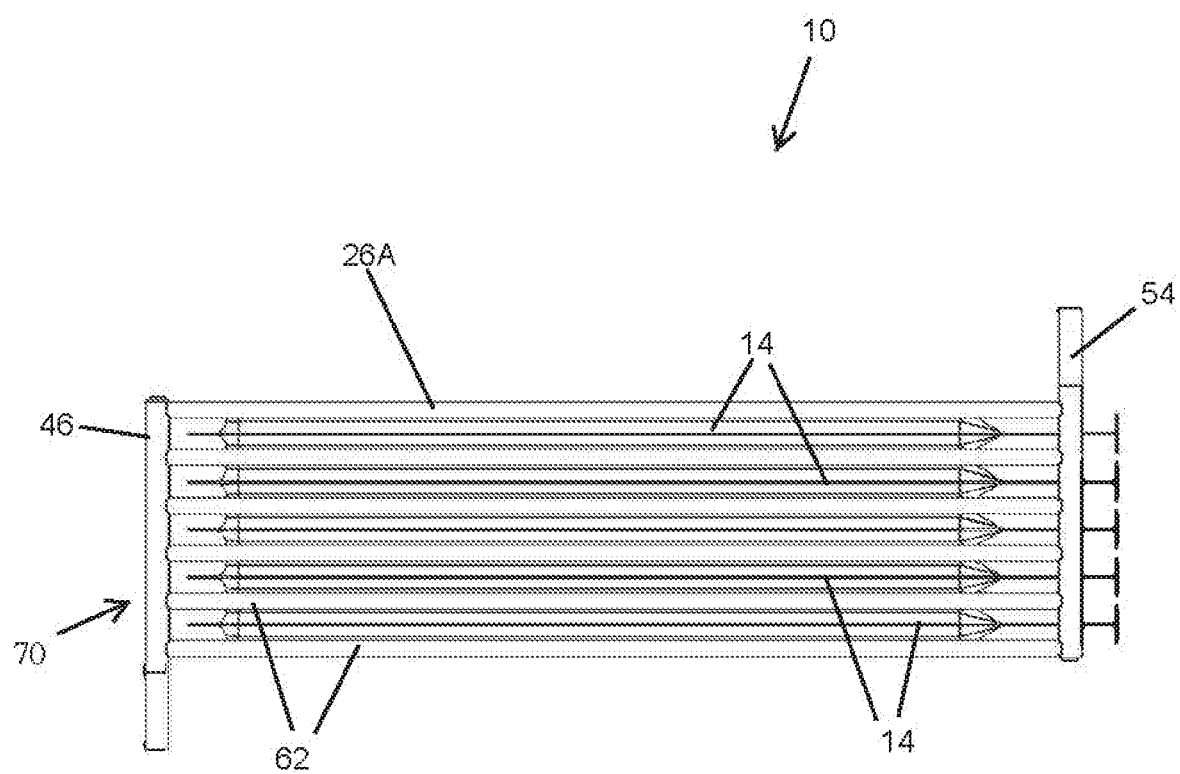
FIG. 2C is a top view of the thermal management system of FIG. 1.

With reference to FIGS. 1 and 2A, the thermal management system 10 includes a first thermal regulation system 26A disposed on one side of the pouch cells 14 (e.g., above the pouch cells 14) and a second thermal regulation system 26B disposed on an opposite side of the pouch cells 14 (e.g., below the pouch cells 14). Thermal conduction devices 22 extend from each of the thermal regulation systems 26A, 26B toward one another, and are disposed adjacent to the pouch cells 14, including in between adjacent pouch cells 14.

The thermal conduction device 22 may be any heat transfer device (e.g., a heat spreader) that receives heat from one or more of the pouch cells 14 (or other heat sources) and transfers the heat away from the pouch cell 14 and to one of the thermal regulation systems 26A, 26B. In the illustrated embodiment, each thermal conduction device 22 includes a flat or generally flat conduction plate 34 (e.g., a flexible sheet) made of graphite (e.g., encapsulated graphite). The conduction device 22 contacts a surface 38 (FIG. 3A) of the pouch cell 14 or is otherwise closely positioned or spaced relative to the surface 38 of the pouch cell 14 for thermal communication with the pouch cell 14. In some embodiments, the thermal conduction device 22 may be positioned proximate the surface 38 of the pouch cell 14 such that there is a gap between the thermal conduction device 22 and the pouch cell 14. In this configuration, the thermal conduction device 22 still receives heat from the pouch cell 14 even though the thermal conduction device 22 is spaced from the pouch cell 14.

The thermal conduction plate 34 has relatively high thermal conductivity to produce uniform heat distribution across the surfaces of the pouch cell 14, smoothing out hot spots and creating a more isothermal temperature profile across the surface 38 of the pouch cell 14. In some embodiments, and as described further herein, an edge of the plate 34 extends past the pouch cell surface 38 and thermally interfaces with a secondary heat extraction system (e.g., one of the thermal regulation systems 26A, 26B). The secondary heat extraction systems extract heat from the thermal conduction device 22 (e.g., from the plate 34) to control and to maintain the pouch cell 14 within a required operating temperature range. High thermal conductivity materials other than graphite, including but not limited to aluminum and copper, may be used in alternative embodiments of the thermal conduction device 22.

One feature of the illustrated thermal conduction device 22 is the use of an encapsulated graphite material for heat transfer. For example, a graphite material core with very high in-plane thermal conductivity in comparison to copper and aluminum, may be protected (e.g., encapsulated) within a protective skin (metal foil, polymer, composite sheet, carbon fiber etc.) to provide good thermal transfer capability. The very high in-plane thermal conductivity of the graphite core minimizes the thermal gradient between the high temperature regions of the pouch cell 14 and the interface with the thermal regulation system 26A, 26B, resulting in a lower operating temperature and a temperature profile across the pouch cell surface 38 that is close to or approaching isothermal conditions.

With continued reference to FIGS. 1 and 2A, the use of the conduction plate 34 as a graphite spreader may provide further increased flexibility in comparison to solid metal plates. This flexibility accommodates expansion and contraction of the pouch cell 14 caused by expansion and contraction of the electrolyte solution contained within the pouch cell 14 in response to changes in temperature. To benefit from the increased flexibility of the graphite-based conduction plate 34, and as illustrated in FIG. 1, a configuration of the thermal conduction device 22 may incorporate separate conduction plates 34 that are connected independently to the upper and lower thermal regulation systems 26A, 26B, respectively. The upper and lower thermal regulation systems 26A, 26B are fixed rigidly in position. By separating the thermal conduction devices 22, increased flexibility is achieved.

A further embodiment of the thermal conduction device 22 uses graphene sheets or films as an alternative to graphite. As graphene has excellent barrier properties, there is no need to encapsulate the graphene, providing an improvement in thermal performance versus that of an encapsulated graphite device. In addition, the 2D-like configuration or flat nature of the graphene sheets has a very small thickness and gives a very high level of flexibility.

In some embodiments the grains of the graphene or graphite flakes are all aligned along a common direction in a plane of the thermal conducting device, such that heat is directed in the common direction.

It should be noted that the surface of the graphene may be functionalized, potentially by the addition of a copper flash or polymerization. Functionalization achieves benefits such as improved through-plane thermal conductivity and increased adhesion of the individual graphene layers. Although true graphene should be one atom thick (2D), commercially available materials can be manufactured from using flakes with up to 20 layers. The surface of the flakes is functionalized by, for example, polymerization which helps protect the graphene and helps the flakes adhere to one another during consolidation. Copper flash does the same but has a higher thermal conductivity and is more difficult to consolidate into bulk material.

In a further embodiment of the thermal management system 10, the pouch cell 14 directly incorporates the thermal conduction device 22 within the pouch cell 14, eliminating or reducing thermal resistance between the thermal conduction device 22 and the pouch cell surface 38 in the thermal path. As such, in this configuration, the heat source or pouch cell 14 is directly coupled to the thermal regulation system 26A, 26B. In addition, by the addition of one or more layers between the cell sheet layers, the thermal conductivity through the thickness (width) of the pouch cell 14 can be made isothermal (i.e., a 3D isothermal temperature profile). In a case where graphite or graphene based thermal conduction materials are used, the material may replace the existing graphitic layer and perform both the electrical and thermal functions within the pouch cell 14.

Figure 4A:
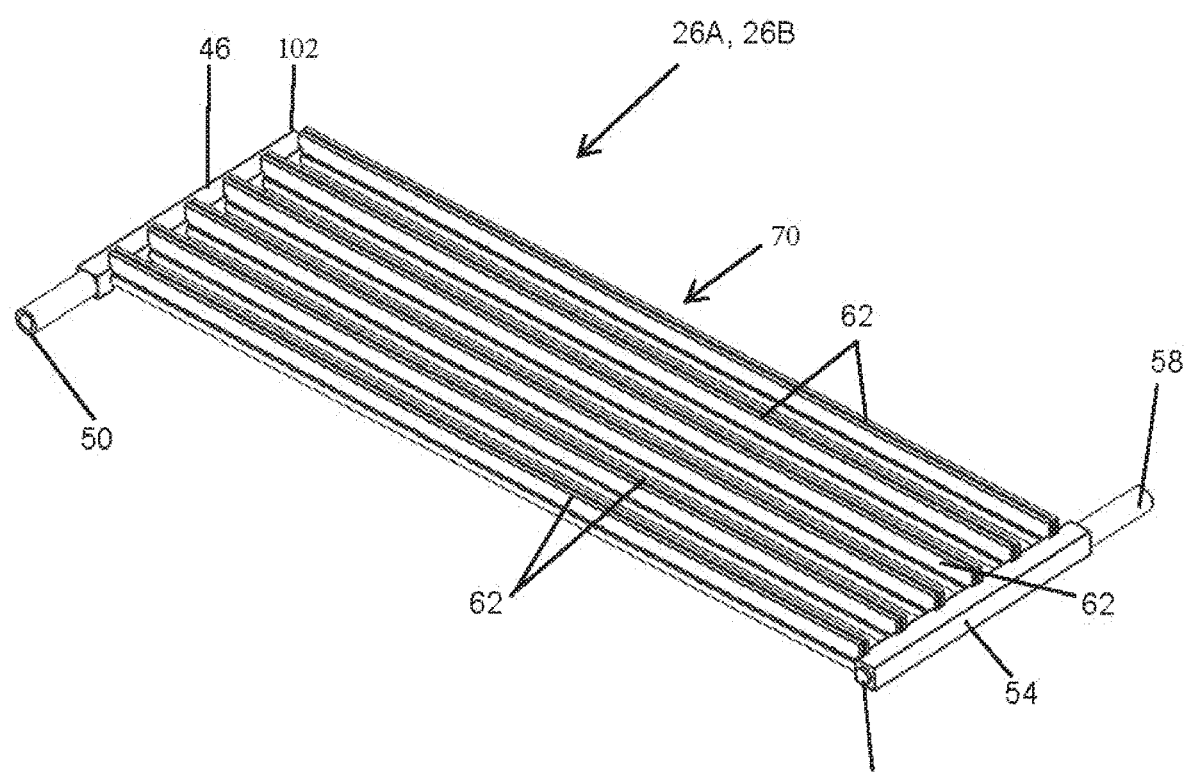
FIG. 4A is a perspective view of a framework of the thermal management system of FIG. 1, the framework including an inlet manifold, an outlet manifold, and a plurality of intermediate frame members extending therebetween.
Figure 4B:
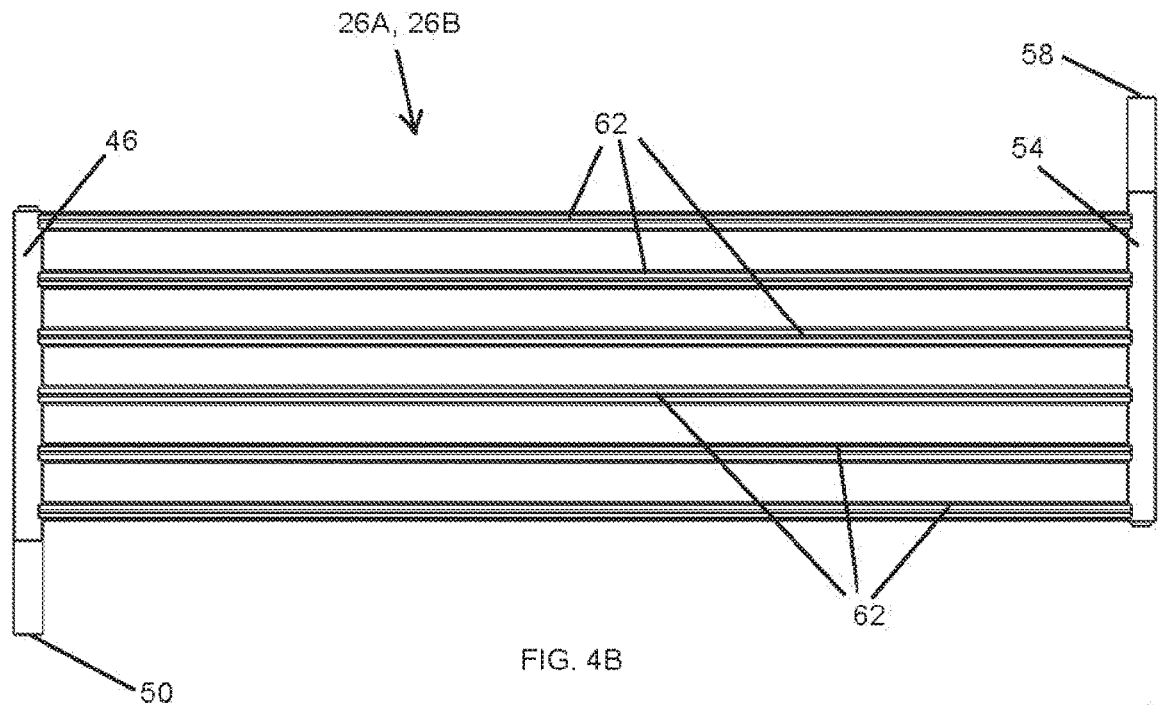
FIG. 4B is a top view of the framework of FIG. 4A
Figure 4C:
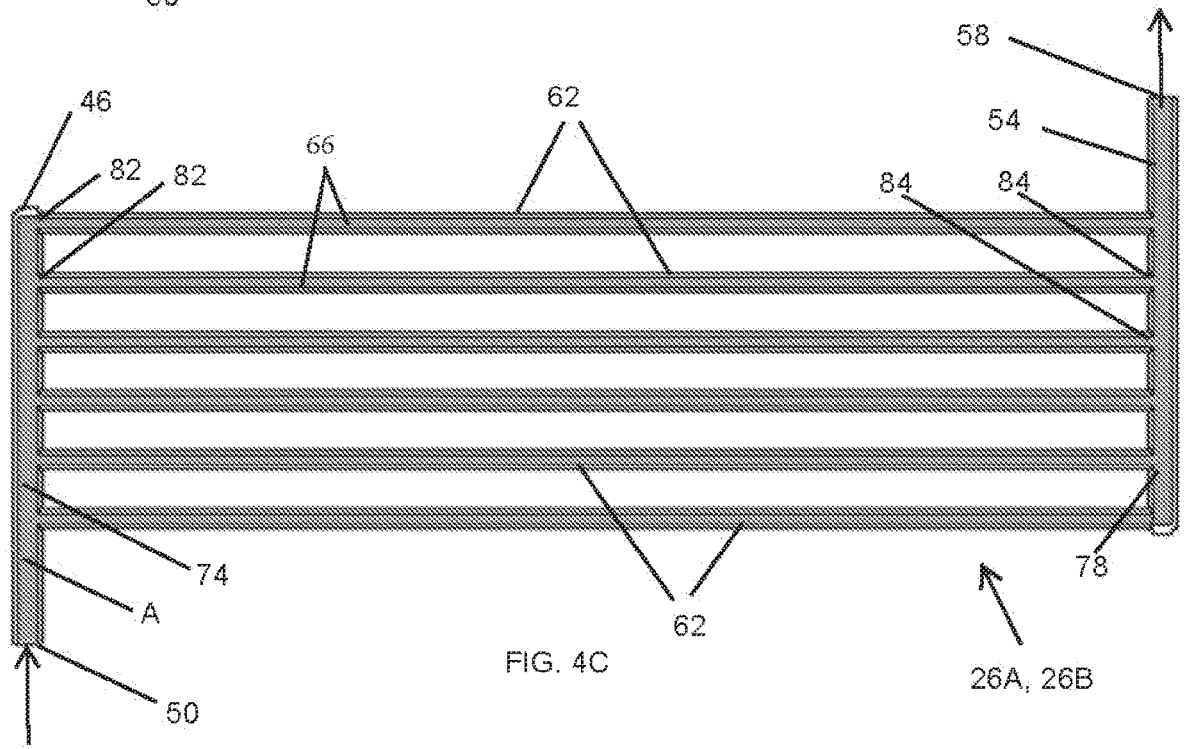
FIG. 4C is a cross-sectional view of the framework of FIG. 4A

With reference to the exemplary embodiment of FIGS. 4A-4C, each of the thermal regulation systems 26A, 26B is formed in the nature of a framework of manifolds (i.e., frame members), including pipes, tubes, etc. that are coupled to one or more of the thermal conduction devices 22. In the illustrated embodiment, as shown in FIG. 4A-4C, each thermal regulation systems 26A, 26B includes a first frame member 46 having an inlet 50 to receive a working fluid A (e.g., coolant/refrigerant/two-phase flow, as illustrated in FIG. 4C). Each of the thermal regulation systems 26A, 26B also includes a second frame member 54 that is spaced from the first frame member 46. In the illustrated embodiment, the second frame member 54 extends parallel to the first frame member 46. The second frame member 54 includes an outlet 58 for the working fluid A to exit the thermal regulation system 26A, 26B. As illustrated in FIG. 4C, the working fluid A may enter the inlet 50 in one direction, and exit the outlet 58 in the same direction. The thermal regulation system 26A, 26B further includes a plurality of intermediate frame members 62 that extend between the first and second frame members 46, 54. For example, as shown in FIGS. 4A-4C, the intermediate frame members 62 extend perpendicularly relative to the first and second frame members 46, 54 and parallel to one another. The thermal conduction devices 22 are coupled to the intermediate frame members 62 (e.g., see FIG. 13). More specifically, the thermal conduction devices 22 are releasably coupled to the intermediate frame members 62.

The thermal regulation systems 26A, 26B extract heat generated by the pouch cells 14 (or other heat sources) that has been transferred to the thermal conduction devices 22, and thermally regulate the operating temperature of the overall thermal management system 10. In the illustrated embodiment, and as described above, the thermal management system 10 includes an upper thermal regulation system 26A and a lower thermal regulation system 26B. In other embodiments, the thermal management system 10 may include only one thermal regulation system 26, or more than two thermal regulation systems. The upper and lower thermal regulation systems 26A, 26B, as shown in FIGS. 1, 2A-2C, are configured to form the structure of a rigid chassis 70, or more particularly, a low mass rigid chassis, to which the thermal conduction devices 22 and/or pouch cells 14 are coupled. The intermediate frame members 62 of the chassis 70 incorporate fluid flow channels 66 (e.g., microchannels) that enable the working fluid A to pass through the chassis 70. By controlling the flowrate and inlet temperature of the working fluid A, heat extraction from the thermal conduction devices 22 and the temperatures of the thermal conduction devices 22 and pouch cells 14 are controlled.

FIGS. 4A-4C illustrate one of the upper or lower thermal regulation systems 26A, 26B. The thermal regulation system 26A, 26B in the illustrated embodiment includes two elements (i.e., the first frame member 46 and the second frame member 54) that form the outer framework of the chassis 70. The first and second frame members 46, 54 are interconnected by the intermediate frame members 62. The intermediate frame members 62 are a series of parallel structural elements that act as struts or cross-struts. As noted above, the intermediate frame members 62 extend, in some embodiments, perpendicularly between the first frame member 46 and the second frame member 54 (see FIGS. 4A-4C).

With continued reference to FIGS. 4A-4C, the outer framework elements 46, 54 (i.e., the first and second frame members) are hollow, forming large inlet and outlet conduits 74, 78. The conduit 74 of the first frame member 46 of the outer framework elements 46, 54 provides an inlet manifold to supply the working fluid A through inlet ports 82 (FIG. 8) to the intermediate frame members 62. The intermediate frame members 62 are also hollow, but in contrast to the large conduit 74 of the first frame member 46, each of the intermediate frame members 62 includes at least one microchannel 66. More specifically, the microchannels 66 provide relatively high thermal efficiency flow passages that enhance the collection of heat from the parallel thermal conduction devices 22 and transfer the collected heat into the working fluid A flowing through the microchannels 66. The conduit 78 of the second frame member 54 of the outer framework elements 46, 54 acts as an outlet manifold to receive the working fluid A from the microchannels 66 of the intermediate frame members 62 through outlet ports 84 (FIG. 4C) of the second frame member 54.

Each of the intermediate frame members 62 includes one of the microchannels 66 (FIG. 5) to transfer working fluid A from the first frame member 46 to the second frame member 54. In other embodiments, the intermediate frame members 62 may be formed with relatively larger channels. The intermediate frame members 62 thus are configured to conduct the working fluid A along the heated ends of the thermal conduction devices 22 coupled to the intermediate frame members 62 so that heat generated by the thermal conduction devices 22 is absorbed by the working fluid A as the working fluid flows through the second frame member 54. The heat absorbed from the thermal conduction devices 22 by the working fluid A is then transferred out of each of the thermal regulation systems 26A, 26B when the working fluid A exits the outlet 58 of second frame member 54.

Figure 7:
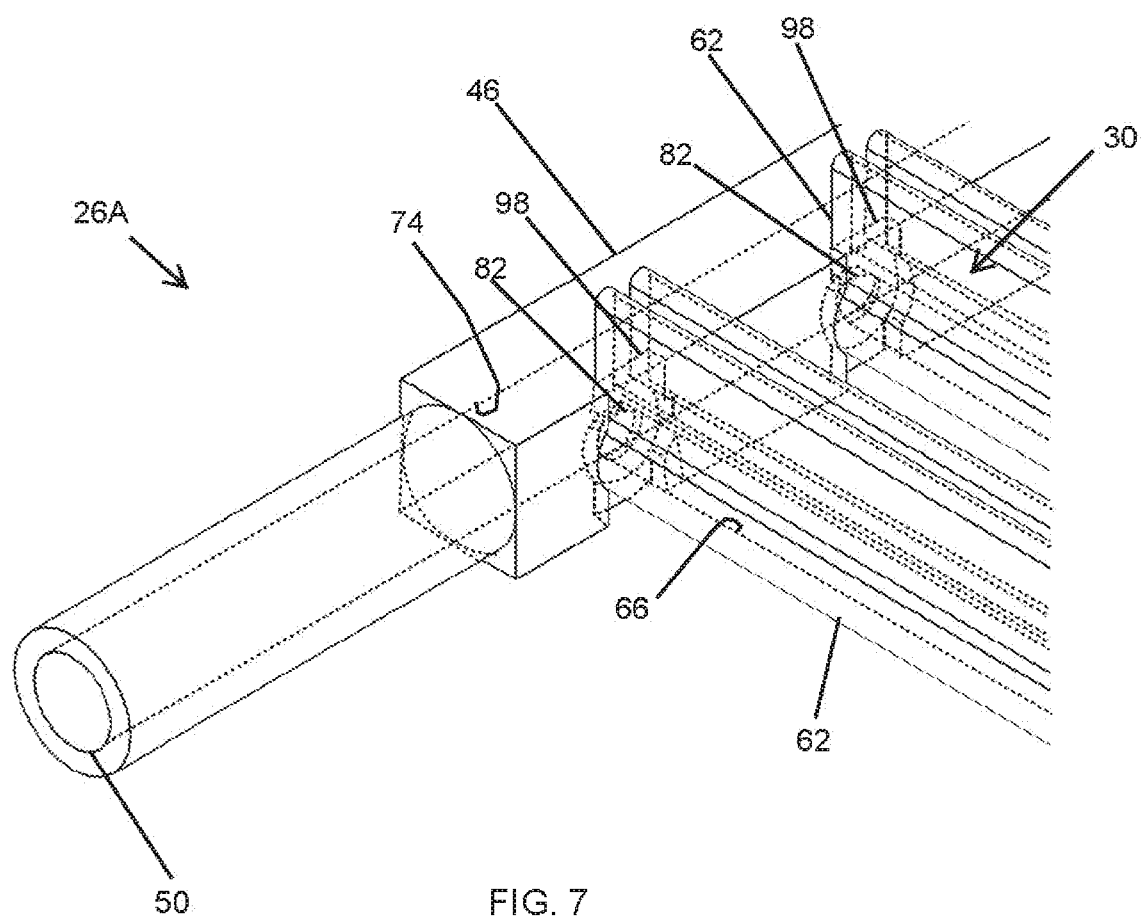
FIG. 7 is an enlarged perspective view of a portion of the framework of FIG. 4A, illustrating (with a clear view of the interior of the framework) one of the intermediate frame members in fluid communication with the inlet manifold.
Figure 8:
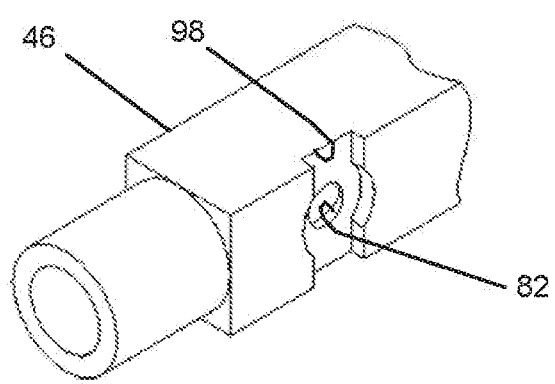
FIG. 8 is a perspective view of a portion of the inlet manifold of FIG. 7.

With reference to FIGS. 4C, 7, and 8, in the illustrated embodiment, the intermediate frame members 62 are joined to the first and second frame members 46, 54 to create an interconnected fluid flow passage network (FIG. 4C) in a parallel flow configuration (other configurations may be used) that balances the pressure drop and/or the flow rate through each microchannel 66. This fluid flow passage network may facilitate a uniform heat transfer coefficient within each parallel microchannel 66. In particular, FIGS. 7 and 8 illustrate the inlet conduit 74, the inlet ports 82, and the microchannels 66 in fluid communication. The illustrated outlet conduit 78 and outlet ports 84 are similarly configured to interact with the microchannels 66 to move the working fluid A. In the illustrated embodiment, the thermal conduction devices 22 extend away from the framework or chassis 70 along a direction that is perpendicular to a direction of movement of working fluid within the framework of the thermal regulation systems 26A, 26B.

Figure 5:
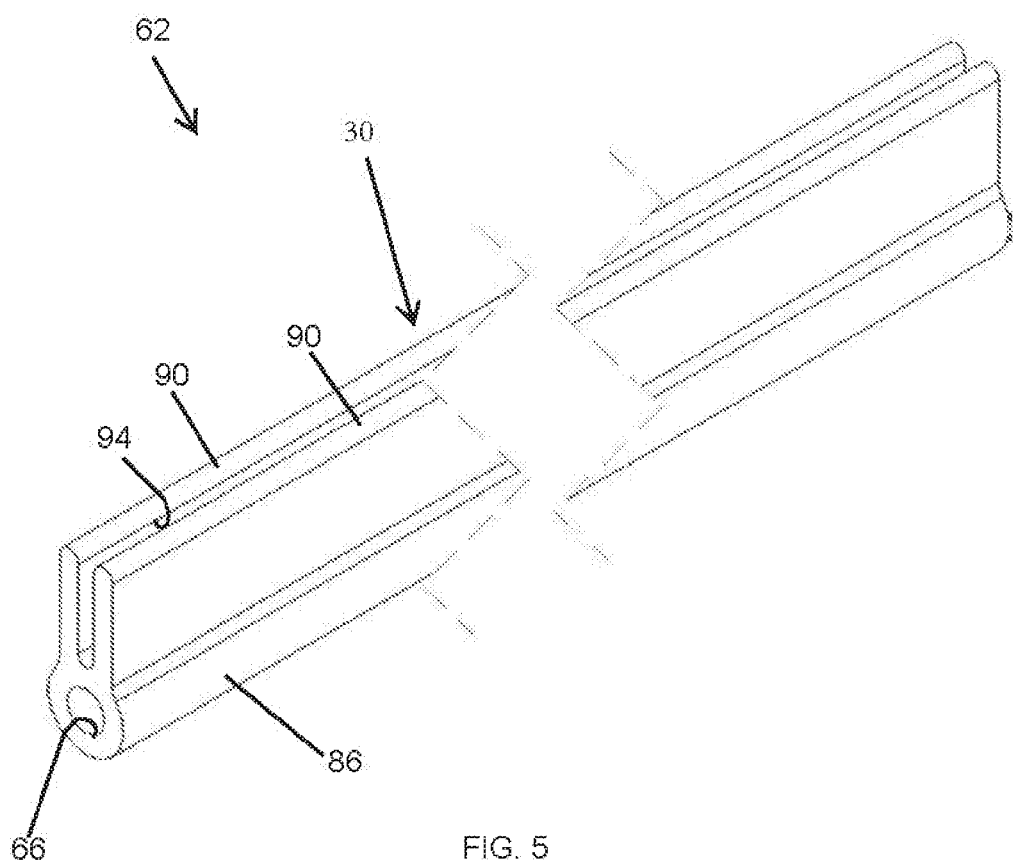
FIG. 5 is a perspective view of one of the intermediate frame members of FIG. 4A.
Figure 6:
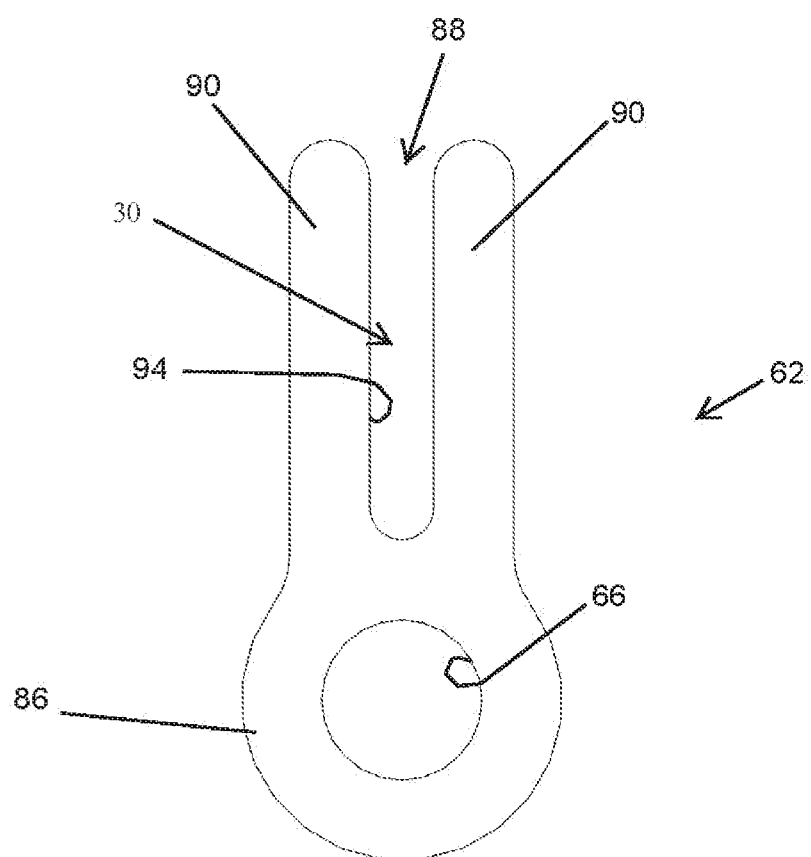
FIG. 6 is a cross-sectional view of the intermediate frame member of FIG. 5.

With reference to FIGS. 5 and 6, the thermal extraction interface 30 corresponds to the connections between the thermal conduction devices 22 and the thermal regulation systems 26A, 26B. In particular, it refers to the connections between ends of the thermal conductions devices 22 (e.g., edges of the plates 34) and the intermediate frame members 62 (e.g., slots described below). For example, as illustrated in the embodiments of FIGS. 5 and 6, the profile of each of the plurality of intermediate frame members 62 includes two main features. The first feature is a circular (or other shape) tube portion 86 within which the circular microchannel passage 66 runs along the longitudinal axis of the intermediate frame member 62. As shown, The tube portions 86 are in fluid communication with the inlet and outlet ports 82, 84 of the conduits 74,78, respectively. The second feature is a pair of parallel spaced-apart protrusions 90 (e.g., fingers, elongate arms, or other extending structural features, etc.) extending outwardly from and along the length of the circular tube portions 86. The protrusions 90 form a slot 94 (e.g., groove, crease, etc.) therebetween that extends along a longitudinal axis of the intermediate frame member 62.

A portion of each of the thermal conduction devices 22 is received and held in the slot 94 formed by each pair of spaced-apart protrusions 90 to form the thermal extraction interface 30 between the thermal conduction device 22 and the tube 86. In particular, heat generated by the thermal conduction devices 22 and received by the pair of spaced-apart parallel protrusions 90 is conducted through the circular tube portion 86 where the heat is then absorbed by the working fluid A flowing through the microchannel 66. The wall thicknesses of the parallel protrusions 90 and the microchannel tube 86 may be varied to optimize heat transfer and minimize the mass of the thermal conduction devices 22. For example, the height and width of the slot 94 may be varied to accommodate various configurations and types of the thermal conduction devices 22 to optimize heat transfer between the thermal conduction devices and the working fluid A flowing through the microchannels of the intermediate frame members 62. An interface material such as solder or epoxy or any other suitable alternative filler material may be used to minimize thermal resistance and maximize thermal conduction across the joint between the thermal conduction devices 22 and the associated intermediate frame members 62.

With reference to FIG. 5, in the illustrated embodiment the intermediate frame members 62 each have a constant cross-sectional profile along the length of its entire length to enable manufacture by extrusion. Alternatively, the cross-sectional profile along the length of the intermediate frame members 62 may be varied by using additional or alternative manufacturing processes.

In some embodiments, a mechanical device may be used to hold the thermal conduction device 22 in position on the intermediate frame member 62. For example, a wedge and/or a plate may be used to clamp or otherwise secure a thermal conduction device 22 to an intermediate frame member. In some embodiments, the intermediate frame member 62 may only include one protrusion 90 instead of a pair of spaced-apart protrusions, and a flat plate may be used to clamp the thermal conduction device 22 to the protrusion 90. The protrusion and separate flat plate thus act as a capture feature. The terms "capture feature" or "capture features" refer to any structural features or structures that are used to "capture" (i.e., receive, retain, hold, secure, encompass, etc.) another component, such as the thermal conduction device 22 or one of the first, second, or intermediate frame members 46, 54, 62, respectively, to hold them in place.

As shown in the embodiment of FIGS. 7-8, the first and/or second frame member 46, 54 includes capture features that are formed as recessed regions 98 (e.g., keyed regions) sized and shaped to receive an end of an intermediate frame member 62. In the illustrated embodiment, each of the first and second frame members 46, 54 includes multiple recesses each dimensioned to correspond to the cross-sectional profile of the intermediate frame members 62 (FIGS. 7 and 8). The recesses 98 of the first and second frame members 46, 54 align the orientation of the intermediate frame members 62 relative to the first and second frame members 46, 54 and the microchannels 66 with the inlet and outlet ports 82, 84 provided along the lengths of the first and second frame members 46, 54 (FIG. 8). In other embodiments, the capture features may be protrusions, fingers, or any other surfaces or structures that are sized and shaped to securely hold one component in position with respect to another component.

In some embodiments, the interfaces between the intermediate frame members 62 and the first and second frame members 46, 54 are sealed by brazing, welding or using an epoxy. In some embodiments, the end of the first frame member 46 opposite the inlet 50 and/or the end of the second frame member 54 opposite the outlet 58 are sealed using a cap 102 (FIG. 4A).

Figure 9A:
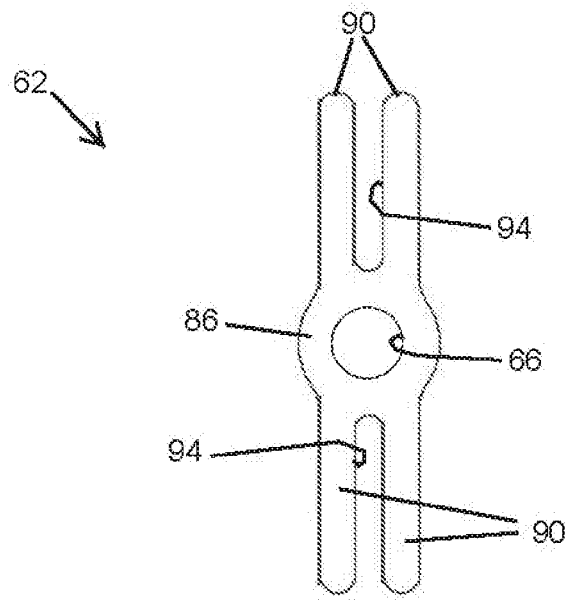
FIG. 9A is a cross-sectional view of another embodiment of the intermediate frame member, the intermediate frame member having four protrusions.

With reference to FIGS. 9A-10D, the cross-sectional profile of each of the illustrated microchannels 66 may be designed to minimize mass (i.e., weight) of the framework, and/or to minimize thermal resistance and improve thermal conduction. For example, the single microchannel 66 may be replaced with a multi-channel configuration (FIGS. 10C-10D) to increase heat transfer. The channel shape and size also may varied. For example, the cross-sectional profile of microchannel 66 may be shaped as a square, triangle or any other desired shape to provide a capillary action. Examples of such different cross-sectional profiles for microchannels 66 are shown in FIGS. 10A-10D, including multi-channel configurations. In addition, more than one thermal conduction device 22 may be thermally associated with each intermediate frame member 62. For example, intermediate frame members 62 provided with more than one capture feature (e.g., two or more pairs of spaced-apart protrusions 90) to hold more than one thermal conduction device 22 are shown in FIGS. 9A and 9B.

Figure 9B:
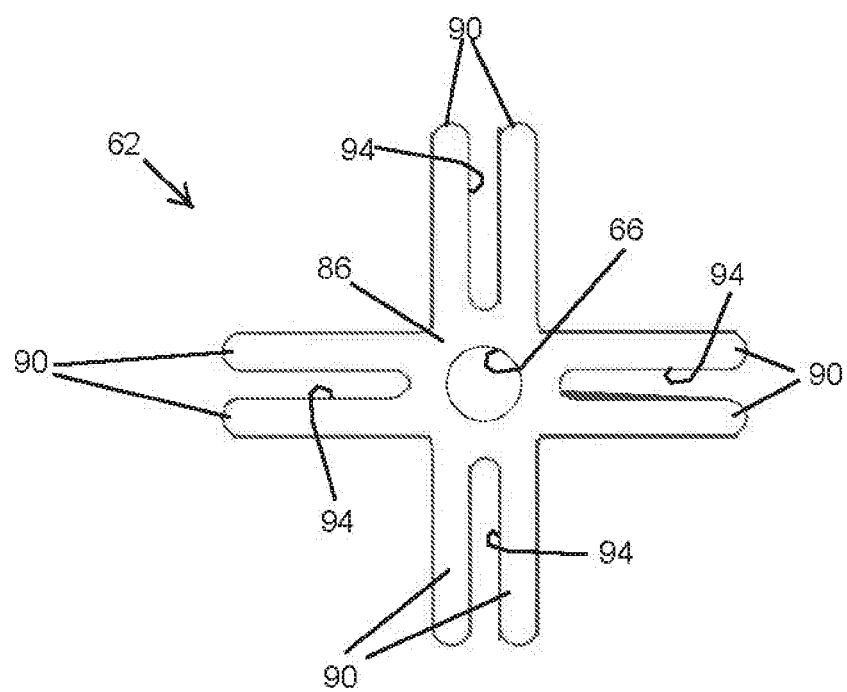
FIG. 9B is a cross-sectional view of another embodiment of the intermediate frame member, the intermediate frame member having eight protrusions.
Figures 10A, 10B, 10C, 10D:
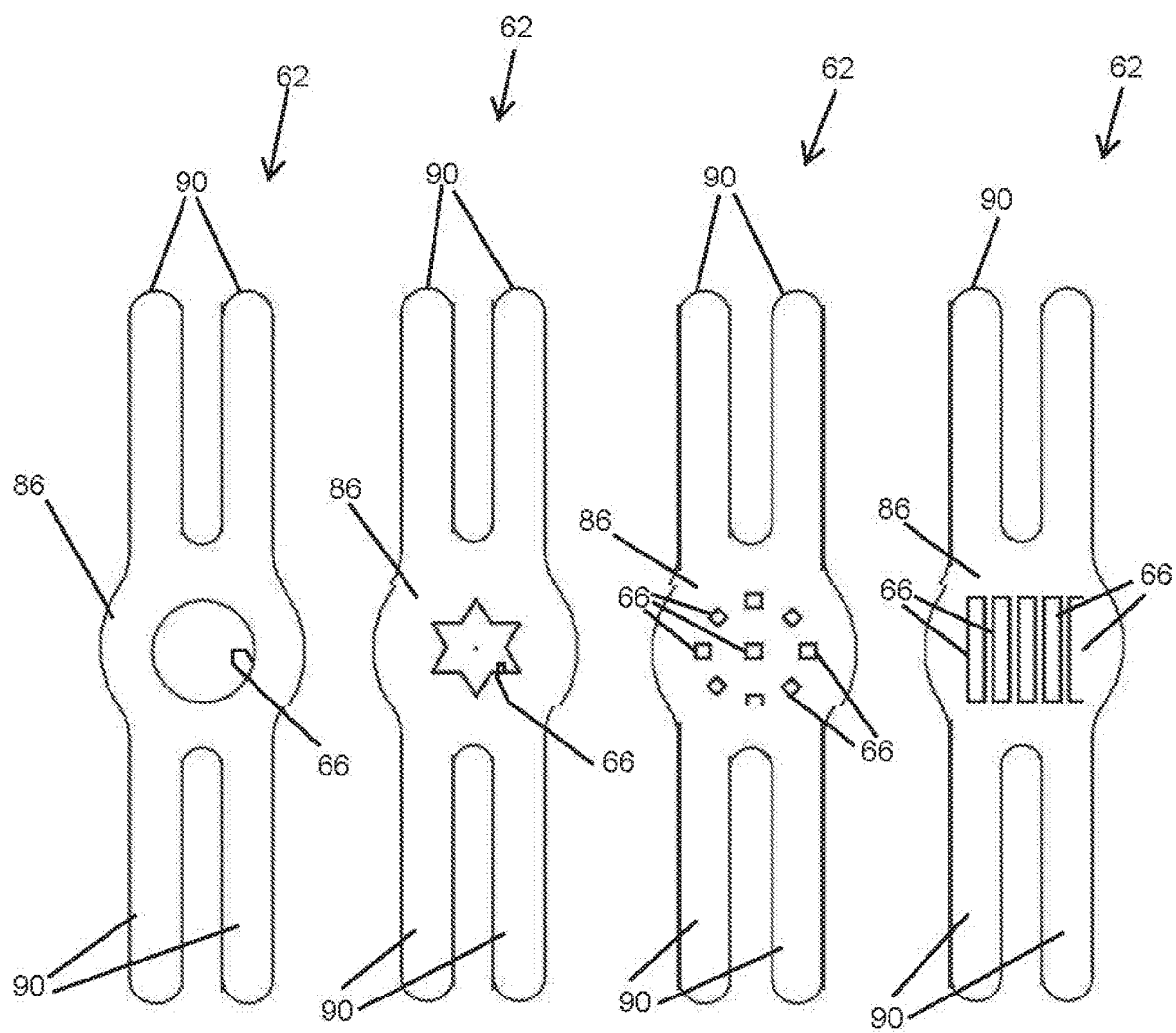
FIGS. 10A-10D are cross-sectional views of the intermediate frame member of FIG. 9A, illustrating different shaped microchannels.
Figure 11:
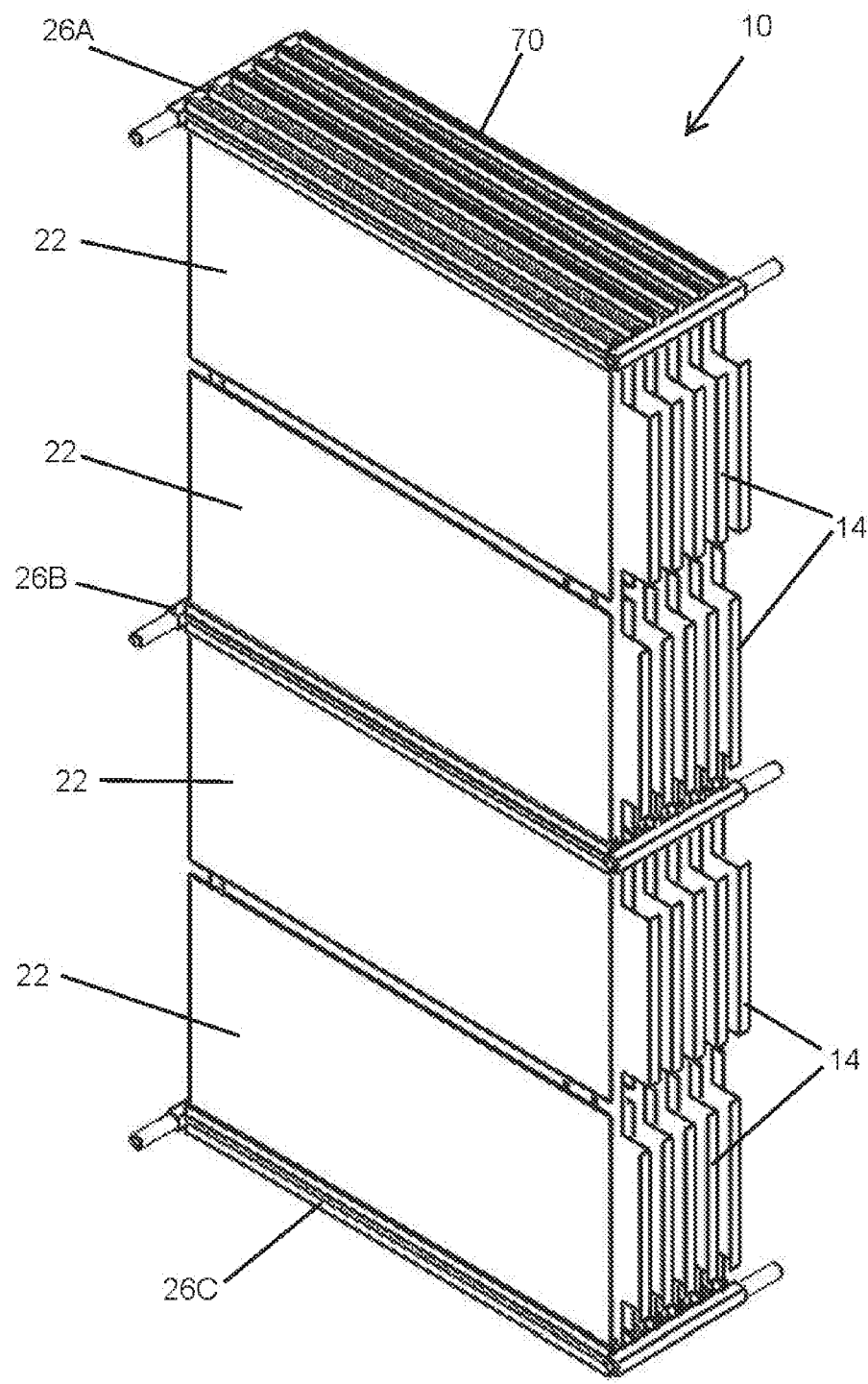
FIG. 11 is a perspective view of two of the thermal management systems of FIG. 1, stacked together.
Figure 13:
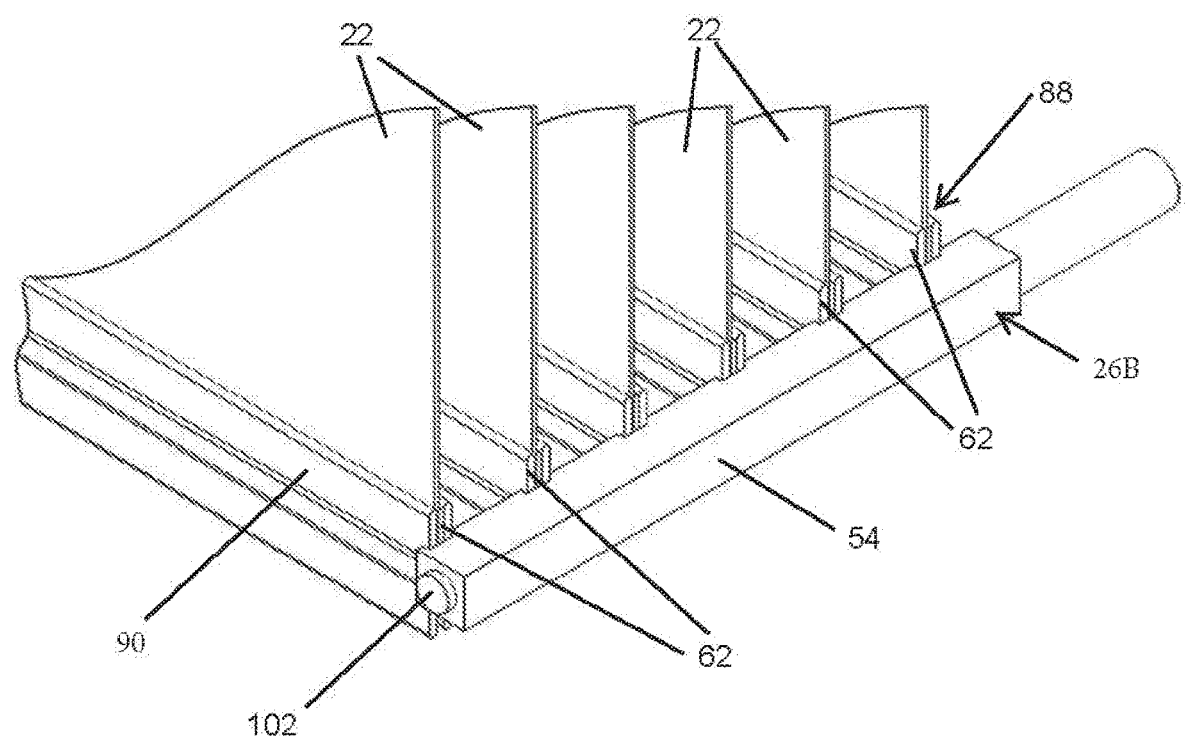
FIG. 13 is an enlarged perspective view of a portion of the stacked thermal management systems of FIG. 12A.

In some embodiments, intermediate frame members 62 with two capture features (e.g., two pairs of spaced-apart parallel protrusions 90) may be used, for example, to thermally manage two battery cells as shown, for example, in FIGS. 11-12B. In the illustrated embodiment, the mass of the entire thermal transfer device 10 is reduced in that two sets of battery cells are thermally managed by three thermal regulation systems 26A, 26B, 26C instead of four systems with a separate pair of thermal regulations systems 26A, 26B for each set of battery cells. In this configuration, the intermediate frame members 62 of the thermal management system 26B are configured as having the cross-section profile as shown in FIG. 9A (the intermediate frame members 62 including two pairs of spaced-apart parallel protrusions 90). In other embodiments, the thermal management system 10 may include multiple sets of battery cells such that the intermediate frame members 62 of the thermal management system 26B are configured as having the cross-section profiles as shown in FIG. 9B (the intermediate frame members 62 including four pairs of spaced-apart parallel protrusions 90A). A close-up view of the assembled components of the thermal management system 10 of FIG. 12A, in particular the thermal regulation system 26B, is shown in FIG. 13. The overall assembly with the pouch cells 14 in position is also shown in FIG. 11.

In some embodiments, the chassis 70 may be formed as a light-weight chassis framework, manufactured from brazed aluminum extrusion profiles (or material other than aluminum) to form parallel flow liquid cold plates or frame members including, for example, the intermediate frame members 62. Each parallel intermediate frame member 62 and flow channel 66 connects to a k-Core foil encapsulated spreader (e.g., conduction device 22) that is installed between two adjacent pouch cells 14. During use, the pouch cells 14 (or other heat sources) generate heat. That heat is transferred to the associated or adjacent thermal conduction device(s) 22 (e.g., to the k-Core plates 34). The thermal conduction devices 22 extend parallel to one another, and extend into spaces or gaps between the pouch cells 14 (e.g., like fingers). Thus, the thermal conduction devices 22 pick up the heat from the pouch cells 14 and move the heat away from the pouch cells 14 toward the thermal regulation system 26A, 26B. As illustrated in FIG. 1, and as described above, a first upper thermal regulation system 26A and a second lower thermal regulation system 26B are provided. The thermal conduction devices 22 extend from both the first thermal regulation system 26A and the second thermal regulation system 26B (e.g., toward each other). Once the heat reaches the ends or edges of the thermal conduction devices 22 (which are captured or otherwise held by the protrusions 90 of the intermediate frame members 62), the heat moves into the microchannels 66 in the intermediate frame members 62. From there the heat is picked up by the working fluid A passing through the microchannels 66, and is moved to the second frame member 54 and then out of the thermal management system 10.

The thermal management systems 10 described herein may be used in electric vehicle (EV) thermal management. In particular, in some embodiments they are directed for use with Formula-E battery packs and other high performance EV applications, although they could be used on vehicles other than electric vehicles, or could be used in systems other than vehicles (e.g., in stationary systems that have heat sources, such as electronics) to remove heat. In some embodiments, the thermal management systems 10 described herein may be used in high performance electric vehicle battery pack applications and low volume and niche EV automotive applications (e.g. busses, excavators, tractors, trucks, etc.).

In some embodiments, the thermal management systems 10 include (1) use of K-Core as a thermal spreader to regulate and even out pouch cell temperature, (2) a K-Core thermal transport to a liquid cooling system and integration with the cooling system, (3) a method or arrangement of interconnections between K-Core material and a cooling system, and/or (4) a design of a liquid cooling system to be a structural chassis framework 70.

Although the invention has been described in detail with reference to certain preferred constructions, variations and modifications exist within the scope and spirit of one or more independent aspects of the invention as described. Various features and advantages of the invention are set forth in the following claims.

What is claimed is:

1. A device for removal of heat from a plurality of heat sources, the device comprising:
   a first manifold configured to receive a working fluid;
   a plurality of elongated intermediate frame members each in thermal communication with at least one of the plurality of heat sources, each elongated intermediate frame member including a channel in fluid communication with the first manifold and configured to receive the working fluid from the first manifold, wherein each elongated intermediate frame member includes a slot extending along a longitudinal axis of the elongated intermediate frame member, wherein the slot has a closed end that extends along the longitudinal axis and is proximal to a longitudinal boundary of the channel and an opposite open end that extends along the longitudinal axis and is distal to the longitudinal boundary of the channel, and wherein the slot is configured to receive a heat spreader and position the heat spreader adjacent at least one of the plurality of heat sources; and a second manifold spaced from the first manifold and in fluid communication with the plurality of elongated intermediate frame members, wherein the second manifold is configured to receive the working fluid from each channel in the plurality of elongated intermediate frame members, and wherein the second manifold is configured to transfer the working fluid away from the plurality of heat sources.

2. The device of claim 1, further comprising a plurality of recesses defined by at least one of the first manifold and the second manifold, each recess having a shape that corresponds to a cross-sectional shape of an end of each of the plurality of elongated intermediate frame members, wherein each recess is configured to receive an end of one of the plurality of elongated intermediate frame members.

3. The device of claim 2, wherein each of the plurality of elongated intermediate frame members extends parallel to each of the other elongated intermediate frame members.

4. The device of claim 2, wherein the plurality of recesses is positioned to align each channel with a first internal channel of the first manifold and a second internal channel of the second manifold.

5. The device of claim 1, wherein the plurality of elongated intermediate frame members is welded to both the first frame member and the second frame member.

6. The device of claim 1, wherein each elongated intermediate frame member includes two protrusions extending parallel to one another and defining the slot.

7. The device of claim 1, wherein a cross-sectional shape of the channel includes at least one from the group of shapes consisting of round, square, and triangular.

8. The device of claim 1, wherein the channel is one of a plurality of channels in each elongated intermediate frame member.

9. The device of claim 1, further comprising a plurality of heat spreaders, each heat spreader configured to receive heat from at least one of the plurality of heat sources as a thermal bridge between the one heat source and one of the plurality of elongated intermediate frame members, wherein an end of each heat spreader is configured to be disposed within the slot of any one of the plurality of elongated intermediate frame members.

10. A heat transfer system comprising:
a plurality of battery pouches;
a framework disposed adjacent the battery pouches along one side of the plurality battery pouches, the framework having an inlet and an outlet for working fluid to enter and exit the framework, respectively; and
a plurality of thermal conducting devices coupled to the framework and extending parallel to one another and away from the framework, wherein each of the thermal conducting devices is a plate of encapsulated graphite having a first end extending between lateral sides of the plate and coupled to the framework, and a second, opposite free end that is disposed between two of the battery pouches, wherein the plates extend away from the framework along a direction that is perpendicular to a direction of movement of working fluid within the framework, wherein the first end of the plate is received in a slot formed in the framework, and wherein the first end of the plate received in the slot faces a working fluid channel in the framework.

11. The heat transfer system of claim 10, wherein the framework includes a first frame member having the inlet and a second frame member having the outlet, and wherein both of the first frame member and the second frame member are manifolds in fluid communication with one another.

12. The heat transfer system of claim 11, wherein the inlet of the first frame member is at a first end of the first frame member, the first frame member having a second end opposite the first end, wherein the outlet of the second frame member is at a first end of the second frame member, the second frame member having a second end opposite the first end of the second frame member, and wherein both the second end of the first frame member and the second end of the second frame member are each sealed with a cap.

13. The heat transfer system of claim 11, further comprising a plurality of intermediate frame members extending between the first frame member and the second frame member, wherein each of the plurality of thermal conducting devices is releasably coupled to one of the plurality of intermediate frame members, and wherein each of the plurality of intermediate frame members defines a channel configured to receive and transfer the working fluid between the first frame member and the second frame member.

14. The heat transfer system of claim 13, wherein the first frame member defines a manifold in fluid communication with each of the channels of the plurality of intermediate frame members.

15. The heat transfer system of claim 14, wherein the second frame member defines a manifold in fluid communication with each of the channels of the plurality of intermediate frame members.

16. The heat transfer system of claim 13, wherein each of the plurality of intermediate frame members includes a tube and at least two protrusions extending from the tube, the protrusions forming a slot, wherein the tube includes the channel, and wherein an end of each of the plurality of thermal conducting devices is disposed within one of the slots.

17. The heat transfer system of claim 13, further comprising a plurality of recesses defined by at least one of the first frame member and the second frame member, each recess having a shape that corresponds to a cross-sectional shape of an end of one of the plurality of intermediate frame members, wherein each recess is configured to receive the end of one of the plurality of intermediate frame members.

18. The heat transfer system of claim 11, wherein the framework forms a rigid chassis that supports the plurality of thermal conducting devices and extracts heat from the plurality of thermal conducting devices.

19. The heat transfer system of claim 11, wherein each of the plurality of thermal conducting devices is configured to receive heat from one of a plurality of heat sources, and wherein each of the plurality of thermal conducting devices is flexible to accommodate expansion and contraction of the respective heat source.

20. The heat transfer system of claim 11, wherein each of the plurality of thermal conducting devices is configured to receive heat from one of a plurality of heat sources to extract heat from the plurality of heat sources to the framework, and wherein the working fluid is directed through the framework to extract the heat from the thermal conducting devices.

21. The heat transfer system of claim 11, wherein the heat transfer system is a first thermal regulation system, and further comprising a second thermal regulation system having a framework spaced from the framework of the first thermal regulation system, and wherein a plurality of thermal conducting devices is coupled to the framework of the second thermal regulation system and extends toward the plurality of thermal conducting devices of the first thermal regulation system.

22. The heat transfer system of claim 21, wherein each framework has a respective inlet and a respective outlet.

23. The heat transfer system of claim 11, wherein adjacent thermal conducting devices of the plurality of thermal conducting devices define a space configured to receive a heat source.

24. The heat transfer system of claim 11, wherein each of the plurality of thermal conducting devices are configured to receive heat from one of a plurality of cells of a battery pack.

25. A device for removal of heat from a plurality of heat sources, the device comprising:
 a first frame member having a first channel configured to direct the flow of working fluid to a plurality of intermediate frame members, each intermediate frame member comprising an intermediate channel in fluid communication with the first channel:
 a second frame member spaced from the first frame member, the second frame member having a second channel in fluid communication with the plurality of intermediate frame members to receive the working fluid from the plurality of intermediate frame members, the second channel configured to transfer the working fluid away from the plurality of heat sources; and
 a plurality of heat spreaders each in thermal communication with one of the plurality of intermediate frame members, wherein each heat spreader is positioned to receive heat from one of the plurality of heat sources,
 wherein at least two protrusions extend from each of the plurality of intermediate frame members, the at least two protrusions on each of the plurality of intermediate fame members form a slot configured to receive one of the plurality of heat spreaders, and
 wherein at least one of the first frame member or the second frame member defines a plurality of recesses each having a shape configured to receive an end of one of the plurality of intermediate frame members including an end of the intermediate channel and an end of each protrusion of the one of the plurality of intermediate frame members.

26. The device of claim 25, wherein each of the heat spreaders extends parallel to the other heat spreaders, and wherein the first frame member extends parallel to the second frame member.

27. The device of claim 25, wherein the first frame member defines an inlet manifold, wherein the second frame member defines an outlet manifold, and wherein the device for removal of heat is configured to direct the working fluid through the inlet manifold, through the intermediate channels of the plurality of intermediate frame members, and through the outlet manifold.

28. The device of claim 25, wherein the plurality of heat spreaders is releasably coupled to the plurality of intermediate frame members.

29. The device of claim 25, wherein each of the plurality of intermediate frame members includes a tube and the at least two protrusions extend from the tube, wherein the tube of each intermediate frame member includes the intermediate channel, wherein the intermediate channel is configured to transfer the working fluid from the first frame member to the second frame member, and wherein the tube is configured to transfer the working fluid adjacent an end of the heat spreader received in the slot of each intermediate frame member.

30. The device of claim 1, wherein the working fluid is configured to flows through the first manifold, the plurality of elongated intermediate frame members, and the second manifold in a same plane.

31. The device of claim 9, wherein each of the heat spreaders is formed as a plate with a first end extending along the longitudinal axis, and wherein the first end is disposed within one of the slots of the intermediate frame members to position the heat spreader adjacent at least one of the plurality of heat sources, and wherein a second end of the heat spreader opposite the first end is disposed outside of the slot.

* * * * *